United States Patent
Matsubayashi et al.

(10) Patent No.: US 10,371,261 B2
(45) Date of Patent: Aug. 6, 2019

(54) MARTENSITIC STAINLESS-STEEL SHEET AND METAL GASKET

(71) Applicant: NIPPON STEEL NISSHIN CO., LTD., Tokyo (JP)

(72) Inventors: Hiroyasu Matsubayashi, Yamaguchi (JP); Sadayuki Nakamura, Hiroshima (JP); Junichi Katsuki, Yamaguchi (JP); Ryoji Hirota, Yamaguchi (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 176 days.

(21) Appl. No.: 15/305,108

(22) PCT Filed: Mar. 16, 2015

(86) PCT No.: PCT/JP2015/057624
§ 371 (c)(1),
(2) Date: Oct. 19, 2016

(87) PCT Pub. No.: WO2015/166729
PCT Pub. Date: Nov. 5, 2015

(65) Prior Publication Data
US 2017/0114900 A1    Apr. 27, 2017

(30) Foreign Application Priority Data

May 2, 2014   (JP) ................................. 2014-095354
May 26, 2014  (JP) ................................. 2014-107929
Feb. 20, 2015 (JP) ................................. 2015-032035

(51) Int. Cl.
*C22C 38/00*   (2006.01)
*F16J 15/08*   (2006.01)
(Continued)

(52) U.S. Cl.
CPC .......... *F16J 15/0806* (2013.01); *C21D 6/004* (2013.01); *C21D 6/005* (2013.01); *C21D 6/008* (2013.01);
(Continued)

(58) Field of Classification Search
CPC ........ F16J 15/0806; F16J 15/08; C21D 6/004; C21D 6/005; C21D 6/008; C21D 8/0226;
(Continued)

(56) References Cited

U.S. PATENT DOCUMENTS 8,273,191 B2 * 9/2012 Hirakawa ................ C21D 6/00
                                                148/325
9,987,706 B2 * 6/2018 Sugama ................. B23K 20/02
(Continued)

FOREIGN PATENT DOCUMENTS

JP    2000-109957    4/2000
JP    2002-317251    10/2002
(Continued)

*Primary Examiner* — Gilbert Y Lee
(74) *Attorney, Agent, or Firm* — Clark & Brody

(57) ABSTRACT

Provided is a martensitic stainless-steel sheet having a reduced anisotropy in workability and fatigue resistance which are attributable to oxide based inclusions. A martensitic stainless-steel sheet which has a steel composition that contains, in terms of mass %, 0.030 to 0.300% C, 0.20 to 2.50% Si, 0.15 to 4.00% Mn, 0.01 to 1.00% Ni, 11.00 to 15.00% Cr, 0.001 to 0.100% N, 0.0001 to 0.0350% Al, 0 to 0.50% V, 0 to 0.50% Nb, 0 to 0.50% Ti, 0 to 0.020% B, and a balance of Fe and unavoidable impurities, and that has a value of γmax, determined by the following equation (1), of 80.0 or greater, and in which oxide based inclusions are observed in the metallographic structure, the oxide based inclusions having a converted composition comprising up to 30 mass % or less $Al_2O_3$, 20 to 60 mass % $SiO_2$, and 15 to 70 mass % MnO.

7 Claims, 3 Drawing Sheets

(51) Int. Cl.
| | |
|---|---|
| C21D 9/46 | (2006.01) |
| C22C 38/58 | (2006.01) |
| C21D 8/02 | (2006.01) |
| C22C 38/02 | (2006.01) |
| C22C 38/04 | (2006.01) |
| C22C 38/06 | (2006.01) |
| C22C 38/46 | (2006.01) |
| C22C 38/48 | (2006.01) |
| C22C 38/50 | (2006.01) |
| C22C 38/54 | (2006.01) |
| C23G 1/02 | (2006.01) |
| C21D 6/00 | (2006.01) |
| C21C 7/06 | (2006.01) |

(52) U.S. Cl.
CPC ......... *C21D 8/0226* (2013.01); *C21D 8/0236* (2013.01); *C21D 8/0263* (2013.01); *C21D 8/0273* (2013.01); *C21D 8/0278* (2013.01); *C21D 9/46* (2013.01); *C22C 38/00* (2013.01); *C22C 38/001* (2013.01); *C22C 38/02* (2013.01); *C22C 38/04* (2013.01); *C22C 38/06* (2013.01); *C22C 38/46* (2013.01); *C22C 38/48* (2013.01); *C22C 38/50* (2013.01); *C22C 38/54* (2013.01); *C22C 38/58* (2013.01); *C23G 1/02* (2013.01); *F16J 15/08* (2013.01); *C21C 7/06* (2013.01); *C21D 2211/004* (2013.01); *C21D 2211/005* (2013.01); *C21D 2211/008* (2013.01)

(58) Field of Classification Search
CPC .. C21D 8/0236; C21D 8/0263; C21D 8/0273; C21D 8/0278; C21D 9/46; C21D 2211/004; C21D 2211/005; C21D 2211/008; C22C 38/00; C22C 38/001; C22C 38/02; C22C 38/04; C22C 38/06; C22C 38/46; C22C 38/48; C22C 38/50; C22C 38/54; C22C 38/58; C23G 1/02; C21C 7/06
See application file for complete search history.

(56) References Cited

U.S. PATENT DOCUMENTS

| | | | |
|---|---|---|---|
| 2013/0039801 A1* | 2/2013 | Tsuge | C22C 38/001 420/38 |
| 2016/0114423 A1* | 4/2016 | Sugama | B23K 20/02 228/193 |

FOREIGN PATENT DOCUMENTS

| | | |
|---|---|---|
| JP | 2002-332543 | 11/2002 |
| JP | 2008-163452 | 7/2008 |
| WO | 2012/157680 | 11/2012 |

* cited by examiner

[Fig.1]
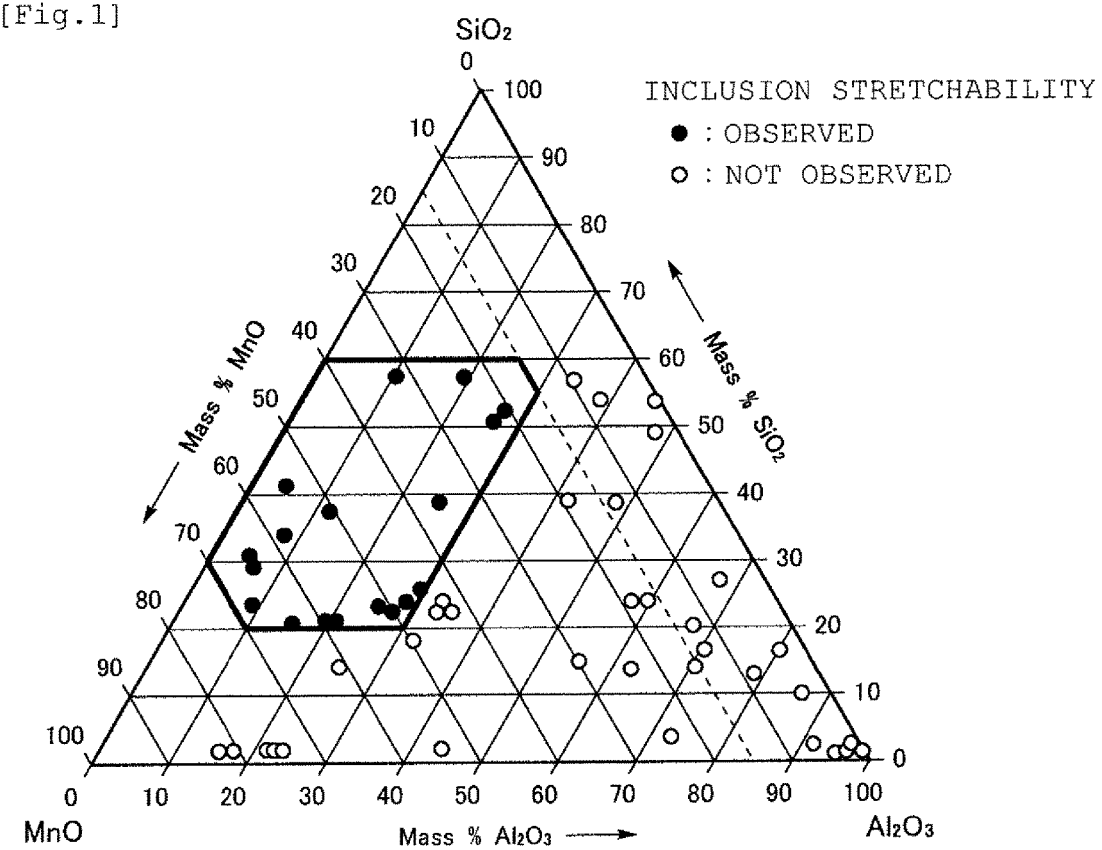
[Fig.2]
(INTERMEDIATE COLD-ROLLED MATERIAL: 0.8 mm$^t$)
(a) COMPARATIVE EXAMPLE
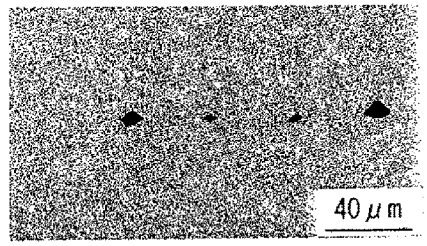
(b) INVENTION EXAMPLE
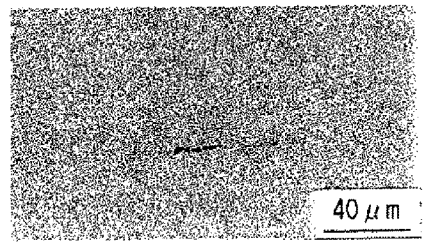

[Fig. 3]
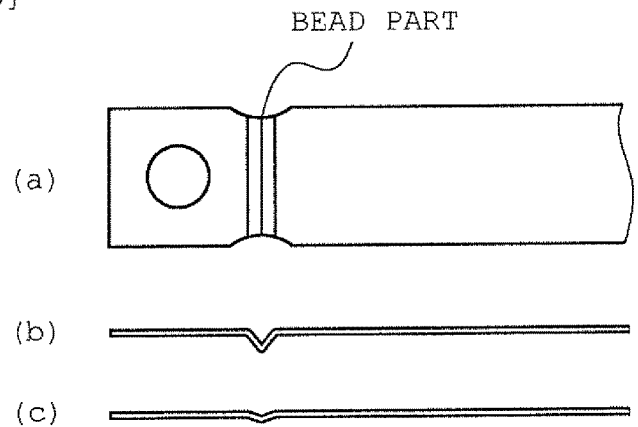
[Fig. 4]
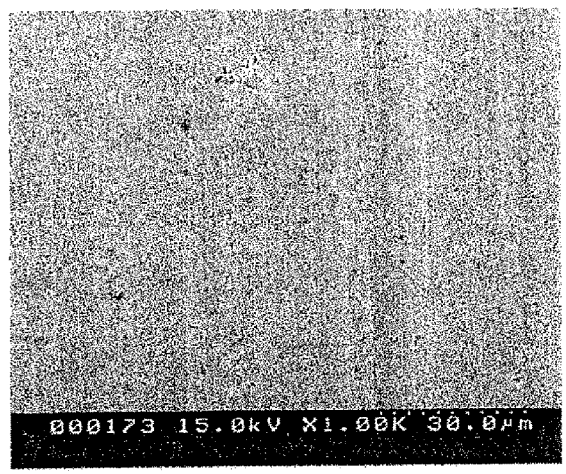
[Fig. 5]
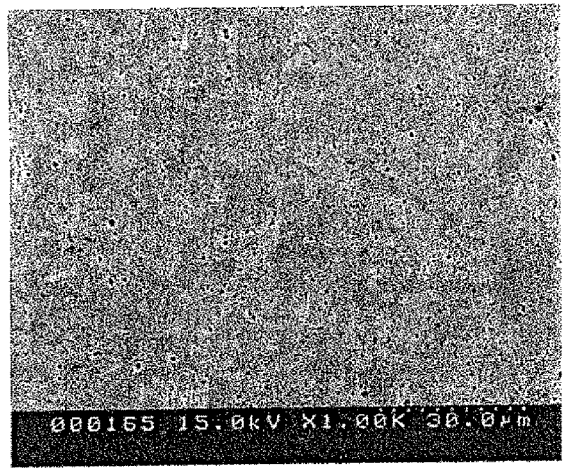

[Fig.6]
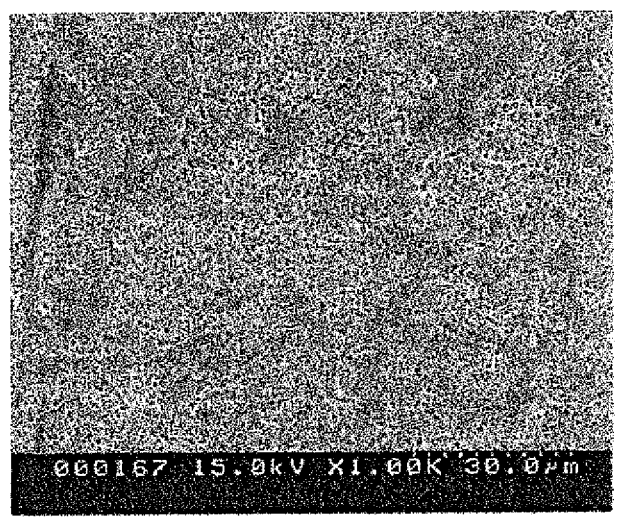

MARTENSITIC STAINLESS-STEEL SHEET AND METAL GASKET

TECHNICAL FIELD

The present invention relates to a low anisotropy stainless steel sheet for a metal gasket having excellent workability and fatigue characteristic and a metal gasket using the same.

BACKGROUND ART

A cylinder head gasket and an exhaust manifold gasket of an engine of an automobile, a motorcycle or the like are exposed to repetitive pressure variations under high temperature, high pressure and high vibrations inherent to the engine. In particular, since a high pressure is applied to the cylinder gasket of the automobile engine upon compression, it is necessary for both contact party materials to contact with a high contact pressure (surface pressure) so as to keep the sealability. A metal gasket to be used for the engine or an exhaust gas passage is generally formed with a bead of a predetermined height (a continuous raised portion) so as to secure the sufficient contact pressure. The bead is normally formed by bead press forming. Therefore, a material steel sheet for manufacturing this kind of metal gasket is required to have high strength, high fatigue characteristic and excellent workability.

In the related art, work-hardened metastable austenitic stainless steel (SUS301 or the like) is heavily used for the gasket to be applied to the automobile engine or the exhaust gas passage. This kind of steel is intended to increase the strength by forming deformation-induced martensite with cold rolling. In order to increase the strength level, it is necessary to increase a cold rolling ratio. The increase in cold rolling ratio lowers the toughness, fatigue resistance and workability. Also, textures are remarkably developed and a characteristic difference between a rolling-parallel direction (L direction) and a rolling-perpendicular direction (C direction), i.e., anisotropy increases.

Also, a painted metal gasket may be used for an industrial piping or the like. This kind of metal gasket is required to have coating adhesion, in addition to the workability and the fatigue characteristic.

In the meantime, martensitic stainless steel is a material intended to increase the strength without depending on the increase in the cold rolling ratio. PTL 1 discloses applying martensitic steel grade to a gasket.

CITATION LIST

Patent Literature

PTL 1: JP-A-2000-109957

SUMMARY OF INVENTION

Technical Problem

The raw material cost of the martensitic stainless steel is lower than the metastable austenitic stainless steel in which high-priced Ni is contained in a large amount. Also, since it is not necessary to perform the work hardening with high cold rolling ratio, the problems resulting from the work hardening such as toughness lowering and anisotropy due to textures are also difficult to occur. However, according to the study of the inventors, as a result of performance evaluation of the metal gasket, which was subjected to the bead formation using the martensitic stainless steel sheet, with strict test conditions, it was found that the performance lowering attributable to the anisotropy of the material may be problematic. As the main causes, it was thought that the workability and the fatigue resistance of a specific direction are lowered due to coarse oxide based inclusions present in a row in the rolling direction in the material (steel sheet).

The present invention is to disclose a technology of reducing anisotropy of a martensitic stainless steel sheet in workability and fatigue resistance, which is attributable to oxide based inclusions. Also, the present invention discloses a technology of improving coating adhesion.

Solution to Problem

The inventors found that the above problems could be solved by softening the oxide based inclusions in the steel sheet.

That is, according to the present invention, there is provided a martensitic stainless hot-rolled steel sheet having a steel composition that contains, in terms of mass %, 0.030 to 0.300% C, 0.20 to 2.50% Si, 0.15 to 4.00% Mn, 0.01 to 1.00% Ni, 11.00 to 15.00% Cr, 0.001 to 0.100% N, 0.0001 to 0.0350% Al, 0 to 0.50% V, 0 to 0.50% Nb, 0 to 0.50% Ti and 0 to 0.020% B, and a balance of Fe and inevitable impurities and that has a value of $\gamma max$, which is determined by a following equation (1), of 80.0 or greater, and in which an average composition of oxide based inclusions observed in a metallographic structure has 30 mass % or less (for example, 1 to 30 mass %) $Al_2O_3$, 20 to 60 mass % $SiO_2$ and 15 to 70 mass % MnO in terms of mass ratio conversion of $Al_2O_3$, $SiO_2$ and MnO.

$$\gamma max = 420C - 11.5Si + 7Mn + 23Ni - 11.5Cr - 49(Ti + Nb + V) - 52Al + 470N + 189 \quad (1)$$

Herein, a place of the element symbol in the equation (1) is assigned with a value of mass % of the corresponding element. Regarding an element, which is not to be contained, of the arbitrarily added elements Ti, Ni and V defined in the equation (1), a value of zero (0) is assigned to a place of the corresponding element symbol.

The elements V, Nb, Ti and B of the steel constitutional elements are arbitrarily added elements. A content of the steel constitutional element Al is a total content of Al. The description "mass ratio conversion of $Al_2O_3$, $SiO_2$ and MnO" means converting contents of Al, Si and Mn of the oxide based inclusions into mass ratios of single oxides of $Al_2O_3$, $SiO_2$ and MnO, respectively.

In the steel composition, any one of following equations (A) and (B) is more preferably satisfied.

$$Si + Mn \geq 1.30 \text{ and } 0.25 \leq Si/Mn \leq 1.50 \quad (A)$$

$$Si + Mn < 1.30 \text{ and } 0.40 \leq Si/Mn \leq 1.50 \quad (B)$$

Herein, places of Si and Mn in the equations (A) and (B) are assigned with contents of Si and Mn denoted in terms of mass %.

As a steel sheet suitable for a processing material to the metal gasket, a martensitic stainless cold-rolled and annealed steel sheet deriving from the hot-rolled steel sheet may be exemplified. A sheet thickness thereof may be managed to 0.05 mm to 0.5 mm, preferably to 0.1 mm to 0.3 mm. The hardness of a sheet surface (rolling surface) is 400 HV to 470 HV, for example.

Among the cold-rolled and annealed steel sheets, a martensitic stainless cold-rolled and annealed steel sheet of which coating adhesion is particularly favorable, a number density of pits having an opening diameter of 1.0 μm or greater, which are formed resulting from detachment of precipitated particles in an acid pickling treatment after finish annealing, is 10 pits/0.01 mm$^2$ or greater and a surface roughness Ra in a rolling-perpendicular direction is 0.500 μm or less is provided.

The precipitated particles are mainly carbide particles of $M_{23}C_6$ (M: transition metal element such as Cr). Although carbonitrides may be formed, the carbides are described, including the carbonitrides, in the specification. The surface roughness Ra is an arithmetic average roughness Ra defined in JIS B0601:2013. The rolling-perpendicular direction means a direction perpendicular to a rolling direction. The opening diameter of the pit means a diameter (longest diameter) of the longest portion of an opening surrounded by an outline of the pit in an SEM (scanning electronic microscope) image when a steel sheet surface is seen in a sheet thickness direction.

As a method of manufacturing the cold-rolled and annealed steel sheet, a manufacturing method of the martensitic stainless cold-rolled and annealed steel sheet is provided, which includes a process (finish annealing process) of heating a cold-rolled steel sheet deriving from the hot-rolled steel sheet to an austenitic single-phase temperature region or a dual-phase temperature region of a ferrite phase and 20 volume % or less of an austenitic phase, in a range of 800° C. to 1,100° C., and cooling the same to transform the austenitic phase into a martensitic phase. The cooling is preferably performed with a condition that an average cooling rate from 800° C. to 200° C. is 1° C./sec to 150° C./sec.

Particularly, as a method of manufacturing a cold-rolled steel sheet having favorable coating adhesion, a manufacturing method of the martensitic stainless cold-rolled and annealed steel sheet is provided, which includes a process (finish annealing process) of heating a cold-rolled steel sheet deriving from the hot-rolled steel sheet to an austenitic single-phase temperature region or a dual-phase temperature region of a ferrite phase and 20 volume % or less of an austenitic phase, in a range of 800° C. to 1,100° C. under an oxidizing atmosphere, and cooling the same at an average cooling rate of 1° C./sec to 150° C./sec from 800° C. to 200° C. to precipitate carbide particles, and a process (acid pickling process) of subjecting the steel sheet after the finish annealing process to an acid pickling treatment to remove oxidized scale on a surface thereof and to detach the carbide particles on the surface, thereby forming pits in the surface.

Also, according to the present invention, there is provided a metal gasket manufactured by forming the cold-rolled and annealed steel sheet. The metal gasket includes a bead formed by press forming and is to be used with a bead apex being pressed to a contact party material. After the bead formation, an aging treatment is performed at 100° C. to 500° C., for example, as required. The term "bead apex" means an apex of a convex portion of the bead to be contacted to the contact party material.

Advantageous Effects of Invention

According to the present invention, since the oxide based inclusions in the material are made to have low melting point and are softened, the oxide based inclusions are stretched in the rolling direction in conformity to deformation of a steel base (matrix) upon the hot rolling and upon the cold rolling thereafter and are avoided to remain in the thinned cold-rolled steel sheet, as coarse particles. For this reason, the lowering of the workability and the fatigue resistance starting from the oxide based inclusions is remarkably improved. In the related art, since coarse particles segmented to some extent by the hot rolling are distributed to be adjacent in the rolling direction, the oxide based inclusions deteriorate the bending workability, in which a bending ridge line becomes the rolling direction, and the fatigue resistance, which causes anisotropy in the workability and the fatigue resistance. According to the cold-rolled and annealed steel sheet of the present invention, the anisotropy is reduced, so that a gasket having high size precision is obtained after the bead formation. Also, when using the gasket, a contact surface pressure to be applied to the bead apex is kept equally because the anisotropy in the fatigue resistance is reduced. As a result, a metal gasket having an excellent leak resistance is implemented. The cold-rolled and annealed steel sheet in which the pits resulting from the detachment of the precipitated particles in the final acid pickling process are dispersed in the surface has excellent coating adhesion.

BRIEF DESCRIPTION OF DRAWINGS

FIG. 1 depicts a relation between a ternary oxide composition of $Al_2O_3$, $SiO_2$ and MnO and stretchability of oxide based inclusions.

FIG. 2 is an optical microscope photograph of the oxide based inclusions observed on an L-section.

FIG. 3 pictorially depicts a shape adjacent to a bead part of a fatigue specimen.

FIG. 4 is an SEM photograph of a steel sheet surface.

FIG. 5 is an SEM photograph of the steel sheet surface.

FIG. 6 is an SEM photograph of the steel sheet surface.

DESCRIPTION OF EMBODIMENTS

[Oxide Based Inclusions]

The inclusions in steel are largely classified into a high ductility type and a difficulty deformable type. The former mainly includes sulfides and the latter mainly includes oxides. Among them, the oxide based inclusions of the difficulty deformable type are difficult to be stretched even upon cold rolling and remain in a steel sheet, as coarse particles. The coarse oxide based inclusion particles deteriorate workability and a fatigue resistance. In general, when making the steel, refining and casting intended to reduce an amount of the inclusions (high cleanliness) and to reduce diameters of the inclusions are performed. However, the excessive high cleanliness increases load of the steel making process, thereby increasing the product cost. Therefore, the present invention adopts a method of lowering a melting point of the oxide based inclusions and softening the same as much as possible, as a technology of manufacturing martensitic stainless steel having a general cleanliness level.

It is thought that the oxide based inclusions are actually composite oxides having Al, Si and Mn as main components. According to the intensive study of the inventors, it was found that when expressing contents of Al, Si and Mn of the oxide based inclusions by a composition converted to single oxides of $Al_2O_3$, $SiO_2$ and MnO, it is possible to specify an inclusion composition range effective to give stretchability to the oxide based inclusions. The composition range substantially coincides with a range in which a relatively low melting point composition is made in a ternary oxide equilibrium diagram of $Al_2O_3$, $SiO_2$ and MnO.

FIG. 1 depicts a relation between a ternary oxide composition of $Al_2O_3$, $SiO_2$ and MnO and stretchability of the oxide based inclusions. Plots in FIG. 1 indicate evaluation results of stretched states of the oxide based inclusions on the basis of a predetermined criterion in a section (L section) parallel to a rolling direction and a sheet thickness of a cold-rolled steel sheet, for many stainless steels. Specifically, a solid circle ● (stretchability: observed) indicates a case where each oxide based inclusion particle is crushed and is clearly extended in the rolling direction by the cold rolling. The coordinates of each plot indicate "average composition of oxide based inclusions" when content ratios of Al, Si and Mn of the oxide based inclusions are converted into mass ratios of $Al_2O_3$, $SiO_2$ and MnO, respectively. In a region (indicated with a thick outline in FIG. 1) in which the converted average composition is 0 to 30 mass % $Al_2O_3$, 20 to 60 mass % $SiO_2$ and 15 to 70 mass % MnO, the oxide based inclusions have stretchability. As described in below embodiments, when the composition of the oxide based inclusions is within the corresponding region, the anisotropy in bending workability and fatigue resistance is considerably improved, so that a material steel sheet, which is particularly suitable for a metal gasket required to have high performance, is obtained.

The composition of the oxide based inclusions can be controlled mainly by a steel composition and steel making conditions. In particular, it is effective to sufficiently secure Mn content in the steel composition, to adjust an Si/Mn mass ratio to a specific range, to limit Al content, and the like. Also, regarding deoxidation during the steel making process, it is effective to perform Si deoxidation.

FIG. 2 is an optical microscope photograph of the oxide based inclusions observed on the L-section in a step where a hot-rolled and annealed steel sheet was subjected to the cold rolling with a rolling ratio of 60% and a sheet thickness of 0.8 mm was thus obtained. FIG. 2(a) depicts Comparative Example No. 21 and FIG. 2(b) depicts an Invention Example No. 5, which will be described later. In general, the oxide based inclusions observed in the martensitic stainless steel sheet are hard, so that they are not crushed well even by the cold rolling and are present in the steel sheet, as shown in FIG. 2(a). The smaller the sheet thickness is, a ratio of diameters of the inclusion particles occupying the sheet thickness increases, thereby deteriorating the workability and the fatigue resistance. Meanwhile, in the martensitic stainless steel sheet of the present invention, the composition of the oxide based inclusions is adjusted to the soft range, so that the oxide based inclusions are crushed by the rolling and are stretched in the rolling direction in conformity to metal flow of the steel base as shown in FIG. 2(b). As the sheet thickness decreases, the stretchability of the oxide based inclusions also increases and the bad influence on the bending workability and the fatigue resistance is considerably reduced. In a utility of a metal gasket for which the bead press forming is to be performed, maximum diameters in the sheet thickness direction of the oxide based inclusions, which are to be observed on the L section of the steel sheet to be provided for the forming, are preferably 5.0 μm or less, and more preferably 3.0 μm or less. Also, it is more effective that the maximum diameters thereof in the sheet thickness direction are stretched up to 1.0% or less of the sheet thickness.

[Steel Composition]

In the below, a chemical composition of the steel sheet (steel composition), which is a target of the present invention, is described. Hereinafter, "%" in the steel composition means "mass %", unless otherwise mentioned.

C is an austenite forming element and an element effective to reinforce a ferrite phase and a martensitic phase. When the C content is excessively low, the reinforcement action is not sufficiently expressed, it is difficult to make component adjustment (moderation of (γmax)) for controlling an austenite forming amount to an appropriate range at temperatures of $Ac_1$ point or higher, and it is not advantageous to secure a predetermined amount of martensite. As a result of diverse studies, the C content is necessarily 0.030% or more, and more preferably 0.060% more. The C content may exceed 0.100%. However, when C is excessively contained, Cr-based carbides are likely to be precipitated at a grain boundary during the cooling process from the austenite forming temperature region, which deteriorates a corrosion resistance. The C content is adjusted to 0.300% or less.

Si is added as a deoxidizing agent during the steel making. According to the study of the inventors, the deoxidization by Si is very effective to control the composition of the oxide based inclusions to the soft region. Si is necessarily added so that the Si content is 0.20% or more. The Si content is more preferably 0.30% or more. Si is dissolved in the ferrite phase and the martensitic phase and has a high action of hardening the martensitic phase. The appropriate hardening is effective to increase the strength of the gasket. However, the excessive hardening deteriorates the workability and the toughness. Also, when Si is excessively contained, high-temperature cracking is caused. The Si content is limited to 2.50% or less.

Mn is an austenite forming element and enlarges an austenitic phase region at high temperatures. The increase in Mn content is effective to increase an amount of martensite. Also, Mn is an element necessary to soften the oxide based inclusions. According to the intensive study of the inventors, in order to sufficiently reduce the anisotropy in the workability and the fatigue resistance for implementing a high-performance gasket, the Mn content of 0.15% or more is effective, and the Mn content of 0.75% or more is further effective. When the Mn content is less, it is difficult to control the composition of the oxide based inclusions to the above-described range, so that it is not possible to stably obtain a gasket having low anisotropy. The Mn content may exceed 1.00%. However, when the Mn content increases, the austenitic phase formed at high temperatures becomes stable and remains without being completely transformed into the martensite during the cooling process to room temperatures. As a result of diverse studies, the Mn content is set to 4.00% or less, and more preferably 3.50% or less.

In order to control the composition of the oxide based inclusions to the soft range, it is effective to adjust a content balance of Si and Mn. For example, it is preferably to set an Si/Mn mass ratio, which is expressed by a ratio of mass % of Si and Mn contents, to a range of 0.25 to 1.50. When a summed content of Si and Mn is less, it is more effective to regulate the Si/Mn mass ratio so that it is not excessively lowered. Specifically, in a refining/casting method using a general steel making equipment of stainless steel, a balance of Si and Mn for easily controlling the composition of the oxide based inclusions to the above-described soft range is set. Herein, the steel composition satisfying any one of following equations (A) and (B) is disclosed.

$$Si+Mn \geq 1.30 \text{ and } 0.25 \leq Si/Mn \leq 1.50 \quad (A)$$

$$Si+Mn < 1.30 \text{ and } 0.40 \leq Si/Mn \leq 1.50 \quad (B)$$

Ni is an austenite forming element and is an element effective to sufficiently secure an amount of martensite. The Ni content of 0.01% or more is effective. When the Ni content is excessive, the retained austenitic phase is easy to remain, which is disadvantageous to the strength improvement. The Ni content is limited to 1.00% or less, and more preferably 0.65% or less.

Cr is an essential element for giving a necessary corrosion resistance to the stainless steel. It is necessary to increase the contents of the austenite forming elements such as C, N, Ni, Mn and the like so as to sufficiently secure the martensite forming amount as the Cr content increases, which increases the cost of the steel material. Also, when a large amount of Cr is contained, the toughness is lowered. A target of the present invention is steel in which the Cr content is 11.00 to 15.00%.

N is an austenite forming element and is effective to reinforce the ferrite phase and the martensitic phase, like C. It is effective to secure the N content of 0.001% or more. When N is excessively contained, nitrides are formed during the cooling process after the annealing, which deteriorates the corrosion resistance and the fatigue resistance. The N content is limited to 0.100% or less.

Al is an element having a strong deoxidizing action. However, according to the study of the inventors, it was found that it is preferably to perform the refining where Si deoxidization, rather than the Al-sole deoxidization, is mainly performed and Al in the steel is contained in a total amount of 0.0001% or more, because it is easy to control the composition of the oxide based inclusions to the above-described range. When the Al content increases, the toughness may be deteriorated. The total content of Al in the steel is limited to 0.0350% or less.

V, Nb, Ti and B are elements effective to improve the manufacturability, the strength, the fatigue resistance and the like. One or more elements thereof may be added, as required. The V content is limited to 0.50% or less, the Nb content is limited to 0.50% or less, the Ti content is limited to 0.50% or less, and the B content is limited to 0.020% or less. The more effective content ranges are 0.01 to 0.50% V, 0.01 to 0.50% Nb, 0.01 to 0.50% Ti and 0.0005 to 0.020% B.

The contents of respective elements are adjusted so that a value of γmax determined by a following equation (1) is 80.0 or greater.

$$\gamma max = 420C - 11.5Si + 7Mn + 23Ni - 11.5Cr - 49(Ti + Nb + V) - 52Al + 470N + 189 \quad (1)$$

Herein, a place of the element symbol in the equation (1) is assigned with a value of mass % of the corresponding element.

The above-mentioned γmax is an index indicating a maximum amount (volume %) of austenite that is formed when increasing the temperature to a temperature region of $Ac_1$ point or higher. In steel in which the contents of respective elements are within the above-described ranges, it may be considered that the austenitic phase at high temperatures is almost transformed to the martensitic phase during the cooling process to room temperatures. Therefore, in the steel base (matrix) of the cold-rolled and annealed material, which is a target of the present invention, the amount of martensite (volume %) is substantially equivalent to γmax, and the remainder is the ferrite phase. When the value of γmax exceeds 100, the steel base has the martensitic structure of substantially 100%.

When a ratio of the ferrite phase occupying the steel base excessively increases, it is difficult to stably implement the high strength suitable for the metal gasket. Also, a crack is likely to occur from a phase interface due to a strength difference between the ferrite phase and the martensite phase, so that the anisotropy in the workability and the fatigue resistance increases. As a result of diverse studies, the present invention adopts the steel composition that has the value of γmax of 80.0 or greater.

[Manufacturing Method]

A representative manufacturing method is exemplified. The steel having the above-described chemical composition is smelted by a normal steel making equipment of stainless steel, so that a cast slab is obtained. Special processing for high cleanliness is not required. However, regarding the deoxidization, Si deoxidization is more preferable than the Al-sole deoxidization. At this time, Al is preferably contained within the above-described range. The cast slab is subjected to the hot rolling, like the general manufacturing method of the martensitic stainless steel sheet, so that a hot-rolled steel sheet is obtained. The oxide based inclusions in the hot-rolled steel sheet are within the above-described composition range and are softened.

The hot-rolled steel sheet is subjected to the annealing, which is then cold-rolled to reduce a sheet thickness. The intermediate annealing is performed during the cold rolling, as required. The softened oxide based inclusions are crushed by pressurization during the cold rolling and are stretched in the rolling direction in conformity to the metal flow of the steel base. The sheet thickness of a final product is preferably 0.05 to 0.5 mm, for example. The cold-rolled steel sheet having a predetermined sheet thickness of a final product is subjected to the finish annealing. The finish annealing temperature is in the austenite forming temperature region of $Ac_1$ point or higher. Specifically, the cold-rolled steel sheet is preferably heated to "an austenitic single-phase temperature region" or "a dual-phase temperature region of a ferrite phase and 20 volume % or less of an austenitic phase", in a range of 800° C. to 1,100° C. Also, it is possible to form the austenitic phase having an amount corresponding to γmax in a temperature range of 900° C. to 1,050° C. in as much as the steel sheet has the steel composition range defined in the present invention. The retaining time at the finish annealing temperature is preferably set to a range of 0 to 60 sec.

The austenitic phase is almost completely transformed to the martensitic phase during the cooling process to room temperatures after the finish annealing. In general, C and N are supersaturated to be dissolved and a large amount of dislocations is included, so that the martensitic phase is hardened. Upon the martensite transformation, the higher the cooling rate is, a degree of the hardening increases, so that the high strength is secured. However, the martensitic phase formed upon rapid cooling has insufficient toughness, so that a post treatment such as tempering heat treatment should be performed. According to the study of the inventors, in order to obtain a martensitic structure having favorable toughness without performing the post treatment such as tempering, it is effective to heat the cold-rolled steel sheet to the "austenitic single-phase temperature region" or the "dual-phase temperature region of a ferrite phase and 20 volume % or less of an austenitic phase", and then to cool the same at a relatively gentle cooling rate (not rapid cooling). However, when the cooling rate is excessively slow, the dissolved amounts of C and N are reduced, so that the strength of the martensitic phase is lowered. Also, when the dissolved amounts of C and N, which are the austenite forming elements, are reduced, the forming amount of the ferrite phase is likely to increase, so that the strength is lowered. As a result of the diverse studies, it is preferably to adjust the cooling rate so that an average cooling rate from 800° C. to 200° C. is 1° C./sec to 150° C./sec. The cooling rate within this range can be easily implemented by air cooling. However, water cooling can also be adopted. In the meantime, the cooling at the relatively gentle cooling rate is effective to form carbides, which are forming sources of pits (which will be described later), in addition to the toughness to the martensitic phase.

In order to improve the coating adhesion, an annealing and acid pickling process of (i) performing the finish annealing under an oxidizing atmosphere such as an air atmosphere, (ii) setting the average cooling rate from 800° C. to 200° C. to 1° C./sec to 150° C./sec and (iii) performing descaling in acid pickling thereafter is very effective.

An oxidized scale is formed on the steel sheet surface by the heating under an oxidizing atmosphere. When the steel sheet at this state is cooled at the cooling rate of which the average cooling rate from 800° C. to 200° C. is 1° C./sec to 150° C./sec, a temporal margin in which the carbides precipitate and grow during the cooling process increases, and a structure where spheroidal carbide particles are dispersed in the matrix (metal base) is obtained. The inventors found that when the annealed steel sheet having the spheroidal particles dispersed therein spheroidal carbide particles just below the scale of the steel sheet surface are easily detached from the steel sheet surface as the scale is removed. At the portions from which the spheroidal carbide particles are detached by the acid pickling, circular pits are formed as detachment marks. The circular pits express an anchor effect to the coating, so that the coating adhesion is improved.

The acid pickling for forming the detachment marks of the carbide particles is preferably performed in the same manner as the acid pickling for descaling. For example, representative acid pickling methods such as (a) electrolysis using neutral salt, sulfuric acid, nitric acid and the like and (b) immersion in a mixed bath of hydrofluoric acid and nitric acid may be exemplified. Any one or both of (a) and (b) methods may be adopted. When the acid pickling conditions are enhanced, so-called over acid pickling is performed, so that the surface roughness increases due to the dissolution of the matrix (metal base). When mention is made to the coating adhesion, the higher surface roughness is generally advantageous. However, when the surface roughness excessively increases, the characteristics (workability, fatigue resistance and sealability) required for a gasket material are deteriorated. Therefore, according to the present invention, a surface form where the pits (detachment marks) are dispersed in a surface having a highly smoothing metal base is made to intend compatibility of the characteristics required for a gasket material and the coating adhesion. Specifically, a surface form is preferable in which the pits having an opening diameter of 1.0 μm or greater, which are formed resulting from the detachment of the precipitated particles in the acid pickling treatment after the finish annealing, are formed in a number density of 10 pits/0.01 mm$^2$ or more in the surface and the surface roughness Ra in the rolling-perpendicular direction is 0.500 μm or less. The surface roughness Ra in the rolling-perpendicular direction is more preferably 0.200 to 0.500 μm.

The number density of the pits having an opening diameter of 1.0 μm or greater, which are formed as the precipitated particles are detached in the acid pickling treatment, can be measured as follows.

[Method of Measuring Number Density of Pits]

The number of detachment marks having an opening diameter of 1.0 μm or greater, which are present in an observation region of a total area of 0.1 mm$^2$ or greater in one or more viewing fields randomly determined on the steel sheet surface, is counted, and the total counted number is divided by the total areas of the observation regions and is thus converted into the number of pits per 0.01 mm$^2$. The pit present on a boundary of the set observation regions is considered as a pit having a shape surrounded by an opening outline of the observation region and the boundary and is determined as to whether it corresponds to a detachment mark having an opening diameter of 1.0 μm or greater.

As described above, the opening diameter of the pit means a diameter (longest diameter) of the longest portion of the opening surrounded by the outline of the pit. However, the opening of the pit, which is formed as the spheroidal carbide particle is detached, has a circular feature. Regarding the pit opening, a diameter of the longest portion of the opening measured in a direction perpendicular to the longest diameter is referred to as "shortest diameter", and a ratio of longest diameter/shortest diameter is referred to as an aspect ratio of the pit opening. The pit, which is formed as the spheroidal carbide particle is detached, has a circular shape of which the aspect ratio of the opening is substantially 2.0 or less.

A cold-rolled and annealed steel sheet having the pits, which have an opening diameter of 1.0 μm or greater and an aspect ratio of the opening of 2.0 or less and are formed as the carbide particles are detached in the acid pickling treatment after the finish annealing, formed in the surface in the number density of 10 pits/0.01 mm$^2$ or greater is a more favorable target of the present invention.

For reference, FIG. 4 depicts an SEM photograph of a surface of an acid pickled material in which a number density of the pits having an opening diameter of 1.0 μm or greater is less than 10 pits/0.01 mm$^2$ and the surface roughness Ra in the rolling-perpendicular direction is 0.110 μm, FIG. 5 is an SEM photograph of a surface of an acid pickled material in which the number density of the pits is 10 pits/less than 0.01 mm$^2$ or greater and the surface roughness Ra is 0.154 μm, and FIG. 6 is an SEM photograph of a surface of an acid pickled material in which the number density of the pits is 10 pits/0.01 mm$^2$ or greater and the surface roughness Ra is 0.391 μm. In all the photographs, a direction parallel with a short side of the photograph is the rolling direction.

The cold-rolled and annealed steel sheet obtained in this way solves the anisotropy of the conventional material, which is caused due to the coarse oxide based inclusions present in a row in the rolling direction, and is suitable for a variety of press forming utilities including the metal gasket. Also, the cold-rolled and annealed steel sheet having a surface in which the detachment marks of the precipitated particles are dispersed has the excellent coating adhesion, too. During the process of manufacturing the metal gasket, a bead having a predetermined height is formed by the bead press forming. The obtained press-formed product may be subjected to an aging treatment at 100° C. to 500° C., as required.

EXAMPLES

Example 1

The cast slabs were obtained by smelting the steels having the chemical compositions shown in Table 1. The Si deoxidization was performed, except for some Comparative Example (No.21). The cast slabs were hot-rolled to obtain the hot-rolled steel sheets having a sheet thickness of 3.0 mm.

TABLE 1

| Classification | No. | C | Si | Mn | Ni | Cr | N | Al | V | Nb | Ti | B | γmax |
|---|---|---|---|---|---|---|---|---|---|---|---|---|---|
| Invention Examples | 1 | 0.198 | 0.38 | 0.99 | 0.59 | 12.60 | 0.041 | 0.0018 | — | — | — | — | 162.57 |
| | 2 | 0.248 | 0.39 | 0.81 | 0.61 | 12.48 | 0.039 | 0.0022 | — | — | — | — | 183.07 |
| | 3 | 0.115 | 0.41 | 0.81 | 0.12 | 12.47 | 0.008 | 0.0021 | — | — | — | — | 101.26 |
| | 4 | 0.118 | 2.02 | 3.02 | 0.12 | 14.06 | 0.040 | 0.0034 | — | — | — | — | 96.16 |
| | 5 | 0.119 | 1.08 | 2.04 | 0.15 | 14.02 | 0.040 | 0.0017 | — | — | — | — | 101.77 |
| | 6 | 0.062 | 0.38 | 1.38 | 0.17 | 12.50 | 0.090 | 0.0330 | — | — | — | — | 121.07 |
| | 7 | 0.063 | 1.45 | 1.48 | 0.20 | 12.53 | 0.040 | 0.0020 | — | — | — | — | 88.35 |
| | 8 | 0.121 | 0.41 | 0.79 | 0.23 | 12.57 | 0.007 | 0.0021 | 0.28 | — | — | — | 90.83 |
| | 9 | 0.122 | 0.41 | 0.78 | 0.21 | 12.55 | 0.007 | 0.0018 | — | 0.30 | — | — | 89.99 |
| | 10 | 0.199 | 0.40 | 0.81 | 0.22 | 12.70 | 0.007 | 0.0003 | — | — | 0.29 | — | 121.72 |
| | 11 | 0.199 | 0.37 | 0.83 | 0.21 | 12.10 | 0.007 | 0.0270 | | | | 0.010 | 141.70 |
| | 12 | 0.113 | 0.20 | 0.15 | 0.12 | 12.50 | 0.008 | 0.0020 | — | — | — | — | 97.88 |
| Comparative Examples | 21 | 0.119 | 0.37 | 0.40 | 0.13 | 12.53 | 0.007 | 0.0017 | — | — | — | — | 99.62 |
| | 22 | 0.071 | 2.02 | 0.27 | 0.58 | 12.48 | 0.040 | 0.0021 | — | — | — | — | 85.99 |
| | 23 | 0.063 | 0.62 | 0.31 | <u>2.30</u> | <u>16.33</u> | 0.012 | 0.0021 | — | — | — | — | 81.14 |
| | 24 | 0.078 | 0.64 | 0.33 | 0.17 | 14.11 | 0.040 | 0.0024 | — | — | — | — | <u>77.03</u> |
| | 25 | 0.038 | 1.51 | 0.35 | 0.16 | 14.05 | 0.040 | 0.0027 | — | — | — | — | <u>50.81</u> |
| | 26 | 0.043 | 1.53 | 1.97 | 0.14 | 14.00 | 0.040 | 0.0035 | — | — | — | — | <u>64.09</u> |
| | 27 | 0.118 | 0.37 | <u>0.05</u> | 0.15 | 12.50 | 0.007 | 0.0019 | — | — | — | — | 97.55 |
| | 28 | 0.071 | 2.01 | <u>0.05</u> | 0.57 | 12.48 | 0.042 | 0.0022 | — | — | — | — | 85.27 |

[Analysis on Composition of Oxide Based Inclusions]

The section (L section) parallel with the rolling direction and the sheet thickness direction of the sample cut from each hot-rolled steel sheet was observed by the SEM, 30 particles were randomly selected from the particles of the oxide based inclusions present in the L section and were subjected to the composition analysis by EDX (energy dispersive X-ray analysis). The contents of Al, Si and Mn of each inclusion were converted into the mass ratios of the single oxides $Al_2O_3$, $SiO_2$ and MnO, and the values of the mass ratios were averaged for the 30 oxide based inclusions to obtain an average composition of the oxide based inclusions in the steel sheet.

Each hot-rolled steel sheet was subjected to the heat treatment at 800° C. for 24 h and a furnace cooling, and the sheet thickness thereof was then reduced by the cold rolling. During the cold rolling, the intermediate annealing of soaking at 800° C. for 1 min was performed one or more times to obtain a cold-rolled steel sheet having a final sheet thickness of 0.2 mm, which was then subjected to the soaking at temperatures shown in Table 2 for 60 sec and cooled to the room temperatures outside the furnace for the finish annealing. As a result, a cold-rolled and annealed steel sheet was obtained. The average cooling rate from 800° C. to 200° C. after the finish annealing was within the range of 1° C./sec to 150° C./sec. Some of the cold-rolled and annealed steel sheets were additionally subjected to the aging treatment in which the sheets were held and soaked at temperatures shown in FIG. 2 for 60 min. The cold-rolled and annealed steel sheets and the aging-treated materials were provided for following tests, as sample materials.

[Hardness]

The sheet surfaces (rolling surfaces) of the sample materials were subjected to the test force 9.8N (hardness symbol HV1) for measurement of Vickers hardness in accordance with JIS Z2244:2009.

[Bending Workability]

The sample materials, which were the finish annealed steel sheets, were subjected to the bending test in accordance with V block method of JIS Z2248:2006. When a longitudinal direction of the specimen is the rolling-parallel direction, it is denoted as L direction, and when the longitudinal direction is the rolling-perpendicular direction, it is denoted as C direction. In the bending specimen of the L direction, the bending ridgeline becomes the rolling-perpendicular direction, and in the bending specimen of the C direction, the bending ridgeline becomes the rolling-parallel direction. A ratio of the minimum bending radius R, at which a defect such as fissures does not occur at an outer side of the bent part, and the sheet thickness t was defined as "bending limit R/t." The bending test was performed three times (the number of tests (n=3)), and the worst result of the three tests was adopted as performance of the test. The specimen in which the bending limit R/t was 1.5 or less in both the L and C directions and a ratio of [a value of the bending limit R/t in the C direction]/[a value of the bending limit R/t in the L direction] was 1.3 or less can be evaluated as having the favorable bending workability, as the material steel sheet for the metal gasket, which is to be provided for the bead press forming.

[Fatigue Resistance]

From the sample materials, the rectangular samples (a width: 8 mm) of which the longitudinal directions were the L direction and the C direction were respectively taken, and were then subjected to the bead press forming to obtain the specimens having an "initial bead" as shown in FIGS. 3(a) and 3(b). A recess width of the initial bead was about 3 mm and a height of the initial bead was about 0.4 mm. The initial bead part was subjected to the constriction corresponding to the initial tightening of the metal gasket, so that a fatigue specimen having a mock bead of which a height of the remaining bead was about 0.1 mm was manufactured, as shown in FIG. 3(c). Meanwhile, in the sectional shapes pictorially shown in FIGS. 3(b) and 3(c), the sizes in the sheet thickness direction are exaggeratingly shown. The fatigue test in which alternating stress was applied to the mock bead part was performed using the fatigue specimen, and the fatigue limit (N/mm$^2$) at the repetition number of $10^7$ was obtained. The specimen in which the fatigue limit was 300 N/mm$^2$ or higher in both the L direction and the C direction and the difference of the fatigue limits in the L direction and the C direction was 30 N/mm$^2$ or less can be evaluated as expressing the excellent fatigue resistance in the metal gasket having the bead press-formed part.

The results are shown in Tables 2(a) and 2(b).

TABLE 2(a)

| Classification | No. | Oxide based inclusion Composition (mass %) | | | Finish Anneal temp. (° C.) | Aging treatment temp. (° C.) | Hardness (HV) | Bending limit R/t | | Fatigue limit (N/mm²) | | |
|---|---|---|---|---|---|---|---|---|---|---|---|---|
| | | Al₂O₃ | SiO₂ | MnO | | | | L direction | C direction | L direction (A) | C direction (B) | difference (A)-(B) |
| Invention Examples | 1 | 15 | 20 | 65 | 950 | none | 470 | 1.0 | 1.1 | 360 | 350 | 10 |
| | 2 | 20 | 20 | 60 | 950 | none | 480 | 1.0 | 1.1 | 350 | 335 | 15 |
| | 3 | 25 | 23 | 52 | 900 | none | 370 | 1.0 | 1.1 | 370 | 360 | 10 |
| | | | | | 950 | none | 440 | 1.0 | 1.1 | 380 | 370 | 10 |
| | | | | | 1000 | none | 440 | 1.0 | 1.1 | 380 | 370 | 10 |
| | | | | | 950 | 120 | 460 | — | — | 400 | 390 | 10 |
| | | | | | | 450 | 458 | — | — | 405 | 395 | 10 |
| | 4 | 10 | 58 | 32 | 950 | none | 470 | 1.0 | 1.1 | 370 | 360 | 10 |
| | 5 | 28 | 52 | 20 | 950 | none | 460 | 1.0 | 1.1 | 370 | 365 | 5 |
| | 6 | 28 | 22 | 50 | 950 | none | 420 | 1.0 | 1.1 | 380 | 370 | 10 |
| | 7 | 30 | 25 | 45 | 950 | none | 430 | 1.0 | 1.1 | 360 | 355 | 5 |
| | 8 | 5 | 30 | 65 | 950 | none | 420 | 1.0 | 1.1 | 350 | 330 | 20 |
| | 9 | 6 | 28 | 66 | 950 | none | 430 | 1.0 | 1.1 | 350 | 340 | 10 |
| | 10 | 8 | 34 | 58 | 950 | none | 430 | 1.0 | 1.1 | 350 | 330 | 20 |
| | 11 | 11 | 37 | 52 | 950 | none | 440 | 1.0 | 1.1 | 370 | 360 | 10 |
| | 12 | 23 | 24 | 53 | 900 | none | 370 | 1.0 | 1.1 | 370 | 360 | 10 |
| | | | | | 950 | none | 440 | 1.0 | 1.1 | 380 | 370 | 10 |
| | | | | | 1000 | none | 440 | 1.0 | 1.1 | 380 | 370 | 10 |
| | | | | | 950 | 120 | 460 | — | — | 400 | 390 | 10 |
| | | | | | | 450 | 460 | — | — | 405 | 395 | 10 |

TABLE 2(b)

| Classification | No. | Oxide based inclusion Composition (mass %) | | | Finish Anneal temp. (° C.) | Aging treatment temp. (° C.) | Hardness (HV) | Bending limit R/t | | Fatigue limit (N/mm²) | | |
|---|---|---|---|---|---|---|---|---|---|---|---|---|
| | | Al₂O₃ | SiO₂ | MnO | | | | L direction | C direction | L direction (A) | C direction (B) | difference (A)-(B) |
| Comparative Examples | 21 | 49 | 49 | 2 | 950 | none | 440 | 1.0 | 1.1 | 330 | 270 | 60 |
| | 22 | 67 | 20 | 13 | 950 | none | 420 | 1.0 | 1.1 | 310 | 250 | 60 |
| | 23 | 98 | 1 | 1 | 950 | none | 410 | 1.0 | 3.0 | 310 | 250 | 60 |
| | 24 | 98 | 0 | 2 | 950 | none | 410 | 1.0 | 3.0 | 300 | 250 | 50 |
| | 25 | 98 | 1 | 1 | 950 | none | 410 | 1.0 | 4.0 | 280 | 230 | 50 |
| | 26 | 20 | 20 | 60 | 950 | none | 415 | 1.0 | 4.0 | 280 | 230 | 50 |
| | 27 | 48 | 50 | 2 | 950 | none | 440 | 1.0 | 1.1 | 330 | 270 | 60 |
| | 28 | 65 | 20 | 15 | 950 | none | 420 | 1.0 | 1.1 | 310 | 250 | 60 |

The Invention Examples had the composition of the oxide based inclusions within the above-described soft range, the low anisotropy in the bending workability and the fatigue resistance and the favorable characteristics suitable for the metal gasket. When the L sections of the sample materials (the cold-rolled and annealed steel sheets) were observed, the oxide based inclusions were crushed and stretched in the rolling direction by the rolling and the maximum diameters in the sheet thickness direction were 2 μm or less.

In contrast, Comparative Example No. 21 was subjected to the Al deoxidization, Comparative Example Nos. 22 to 25 had the high Si/Mn ratio and Comparative Example Nos. 27 and 28 had the low Mn content. All of Comparative Examples had the composition of the oxide based inclusions deviating from the defined ranges of the present invention. Since the oxide based inclusions were hard, they were present in a row in the rolling direction in the cold-rolled and annealed steel sheet, as the coarse particles. Due to this, the bending workability and the fatigue resistance in the C direction were poor. In Comparative Example No. 26, the oxide based inclusions were soft but the value of γmax was small. Therefore, the ferrite phase was excessively contained and the crack was generated from the phase interface due to the strength difference between the ferrite phase and the martensitic phase, so that the anisotropy in the workability and the fatigue resistance increased.

Example 2

A cold-rolled steel sheet having a final sheet thickness of 0.2 mm was obtained using No. 5 steel of Table 1 in the same manner as Example 1. The cold-rolled steel sheet was subjected to the finish annealing at the conditions of Table 3. After the finish annealing, the steel sheet was allowed to cool in air, and the cooling rate was controlled by adjusting the furnace temperature or the amount of air to be blown. A change in temperature upon the cooling was measured by a thermocouple attached to the sample surface, and the average cooling rate from 800° C. to 200° C. was obtained on the basis of a cooling curve thereof. After the sheet temperature was cooled to about the room temperatures, the steel sheet was subjected to the acid pickling treatment by immersing the sheet in the mixed acid pickling solution of hydrofluoric acid 3 mass % nitric acid 12 mass % at 60° C. When the oxidized scale was removed, the acid pickling was ended. Then, the sheet was subjected to normal water rinsing, so that a sample material (acid-pickled material) was obtained. For comparison, a BA treated material obtained by performing the finish annealing under a reducing atmosphere was also prepared. For the acid pickled-material, the hardness and the bending workability were measured in the same manner as Example 1. For each sample material, the surface roughness Ra of the steel sheet surface in the rolling-perpendicular direction was measured by a laser microscope. The steel sheet surface of the acid pickled-material was observed by the SEM. Thereby, the number density of the pits having an opening diameter of 1.0 μm or greater, which were formed resulting from the detachment of the precipitated particles in the acid pickling treatment, was obtained in accordance with the "method of measuring a number density of pits." At this time, the SEM images of 12 viewing fields were obtained for each sample material.

The steel sheet surface of each sample material was applied with an epoxy-based primer, which was then baked and dried at 200° C. for 40 sec. Then, the steel sheet surface was applied with polyester-based paint and was then baked and dried at 215° C. for 50 sec, so that a painted steel sheet sample was obtained. Each painted steel sheet sample was subjected to the bending test in accordance with JIS 3320: 1999. The bending specimen was taken so that the longitudinal direction became the rolling direction, and was bent by 180° at room temperatures so that the bending axis became the rolling-perpendicular direction and the outer surface of the bending became the painted surface. After the bending test, it was observed whether the coating film was peeled at the bending ridgeline. The specimen of which the coating film was not peeled is denoted with 0 (coating adhesion; favorable) and the specimen of which the coating film was peeled is denoted with x (coating adhesion; poor).

The results are shown in Table 3.

TABLE 3

| | Finish annealing | | | | | Bending limit R/t | | Number density of pits having opening diameter of 1.0 μm or greater | Surface roughness Ra in rolling-perpendicular | Evaluation of coating adhesion by |
| --- | --- | --- | --- | --- | --- | --- | --- | --- | --- | --- |
| No. | Atmosphere | Temp. (° C.) | Average cooling rate (° C./sec) at 800-200° C. | Finish acid pickling | Hardness (HV) | L direction | C direction | (pits/0.01 mm$^2$) *1 | direction (μm) | 180° bending *2 |
| 5-1 | Oxidizing atmosphere | 950 | 250 | Hydrofluoric acid + nitric acid, immersion | 480 | 8.0 | 1.0 | 5 | 0.131 | Impossible processing |
| 5-2 | Oxidizing atmosphere | 950 | 150 | Hydrofluoric acid + nitric acid, immersion | 460 | 1.0 | 1.0 | 15 | 0.157 | o |
| 5-3 | Oxidizing atmosphere | 950 | 30 | Hydrofluoric acid + nitric acid, immersion | 450 | 1.0 | 1.1 | 77 | 0.236 | o |
| 5-4 | Oxidizing atmosphere | 950 | 1 | Hydrofluoric acid + nitric acid, immersion | 445 | 1.0 | 1.1 | 109 | 0.293 | o |
| 5-5 | Oxidizing atmosphere | 950 | 0.25 | Hydrofluoric acid + nitric acid, immersion | 300 | 1.0 | 1.1 | 130 | 0.510 | o |
| 5-6 | Reducing atmosphere | 950 | 30 | — | — | — | — | — | 0.020 | x |

*1 detachment marks of precipitated particles formed in finish acid pickling treatment
*2 o: coating film peeling was not observed, x: coating film peeling was observed The specimens (Nos. 5-2, 5-3, 5-4) where the atmosphere of the finish annealing was the oxidizing atmosphere (atmosphere) and the average cooling rate from 800° C. to 200° C. after the finish annealing was 1° C./sec to 150° C./sec had the sufficient hardness of 400 to 470 HV and the favorable bending workability. Also, the number density of pits having an opening diameter of 1.0 μm or greater, which were formed as the precipitated particles were detached in the acid pickling treatment, was 10 pits/0.01 mm² or greater, and the coating adhesion was also favorable. The surface roughness Ra in the rolling-perpendicular direction was 0.500 μm or less, and the gasket having high sealability can be obtained.

In contrast, in the case of the specimen (No. 5-1), since the cooling rate was high after the finish annealing, the martensitic phase was excessively hardened and the bending processing up to 180° in the bending test was impossible. Also, the precipitation growth of the carbides was not sufficient and the number density of pits having an opening diameter of 1.0 μm or greater was small. The specimen (No. 5-5) is an example where the cooling rate after the finish annealing was extremely slow, and had the low hardness. Also, in the acid pickling treatment, the hyperacid pickling was made at a step in which the oxidized scale was removed, and the surface roughness Ra in the rolling-perpendicular direction exceeded 0.500 μm. The specimen (No. 5-6) is an example where the finish annealing was performed under a reducing atmosphere. Since the acid pickling was not performed, the smoothness of the surface was high, so that the coating adhesion was low.

The invention claimed is:

1. A martensitic stainless cold-rolled and annealed steel sheet having a sheet thickness of 0.05 mm to 0.5 mm and having a steel composition that comprises, in terms of mass %, 0.030 to 0.300% C, 0.20 to 2.50% Si, 0.15 to 4.00% Mn, 0.01 to 1.00% Ni, 11.00 to 15.00% Cr, 0.001 to 0.100% N, 0.0001 to 0.0350% Al, 0 to 0.50% V, 0 to 0.50% Nb, 0 to 0.50% Ti, 0 to 0.020% B, and a balance of Fe and inevitable impurities, and that has a value of γmax, which is determined by a following equation (1), of 80.0 or greater, and in which an average composition of oxide based inclusions observed in a metailographic structure has 30 mass % or less $Al_2O_3$, 20 to 60 mass % $SiO_2$ and 15 to 70 mass % MnO in terms of mass ratio conversion of $Al_2O_3$, $SiO_2$ and MnO, and maximum diameters of the oxide based inclusions in the sheet thickness direction are 1.0% or less of the sheet thickness:

$$\gamma max=420C-11.5Si+7Mn+23Ni-11.5Cr-49(Ti+Nb+V)-52Al+470N+189 \quad (1)$$

herein, a place of the element symbol in the equation (1) is assigned with a content of the corresponding element denoted in terms of mass %.

2. The martensitic stainless cold-rolled and annealed steel sheet according to claim 1, wherein in the steel composition, any one of following equations (A) and (B) is satisfied:

$$Si+Mn \geq 1.30 \text{ and } 0.25 \leq Si/Mn \leq 1.50 \quad (A)$$

$$Si+Mn < 1.30 \text{ and } 0.40 \leq Si/Mn \leq 1.50 \quad (B)$$

herein, places of Si and Mn in the equations (A) and (B) are assigned with contents of Si and Mn denoted in terms of mass %.

3. The martensitic stainless cold-rolled and annealed steel sheet according to claim 1 and having sheet surface (rolling surface) hardness of 400 HV to 470 HV.

4. A metal gasket manufactured by forming a cold-rolled and annealed steel sheet according to claim 1, the metal gasket comprising a bead formed by press forming, wherein the metal gasket is to be used with a bead apex being pressed to a contact party material.

5. A martensitic stainless cold-rolled and annealed steel sheet having a steel composition that comprises, in terms of mass %, 0.030 to 0.300% C, 0.20 to 2.50% Si, 0.15 to 4.00% Mn, 0.01 to 1.00% Ni, 11.00 to 15.00% Cr, 0.001 to 0.100% N, 0.0001 to 0.0350% Al, 0 to 0.50% V, 0 to 0.50% Nb, 0 to 0.50% Ti, 0 to 0.020% B, and a balance of Fe and inevitable impurities, and that has a value of γmax, which is determined by a following equation (1), of 80.0 or greater, and in which an average composition of oxide based inclusions observed in a metallographic structure has 30 mass % or less $Al_2O_3$, 20 to 60 mass % $SiO_2$ and 15 to 70 mass % MnO in terms of mass ratio conversion of $Al_2O_3$, $SiO_2$ and MnO and having a surface in which a number density of pits having an opening diameter of 1.0 μm or greater, which are formed as precipitated particles are detached in an acid pickling treatment after finish annealing, is 10 pits/0.01 mm² or greater and a surface roughness Ra in a rolling-perpendicular direction is 0.500 μm or less:

$$\gamma max=420C-11.5Si+7Mn+23Ni-11.5Cr-49(Ti+Nb+V)-52Al+470N+189 \quad (1)$$

herein, a place of the element symbol in the equation (1) is assigned with a content of the corresponding element denoted in terms of mass %.

6. The martensitic stainless cold-rolled and annealed steel sheet according to claim 5, wherein the precipitated particles are carbide particles.

7. A metal gasket manufactured by forming a cold-rolled and annealed steel sheet according to claim 5, the metal gasket comprising a bead formed by press forming, wherein the metal gasket is to be used with a bead apex being pressed to a contact party material.

* * * * *